Jan. 5, 1943.  H. D. MINICH  2,307,056
FILM
Filed Aug. 3, 1940
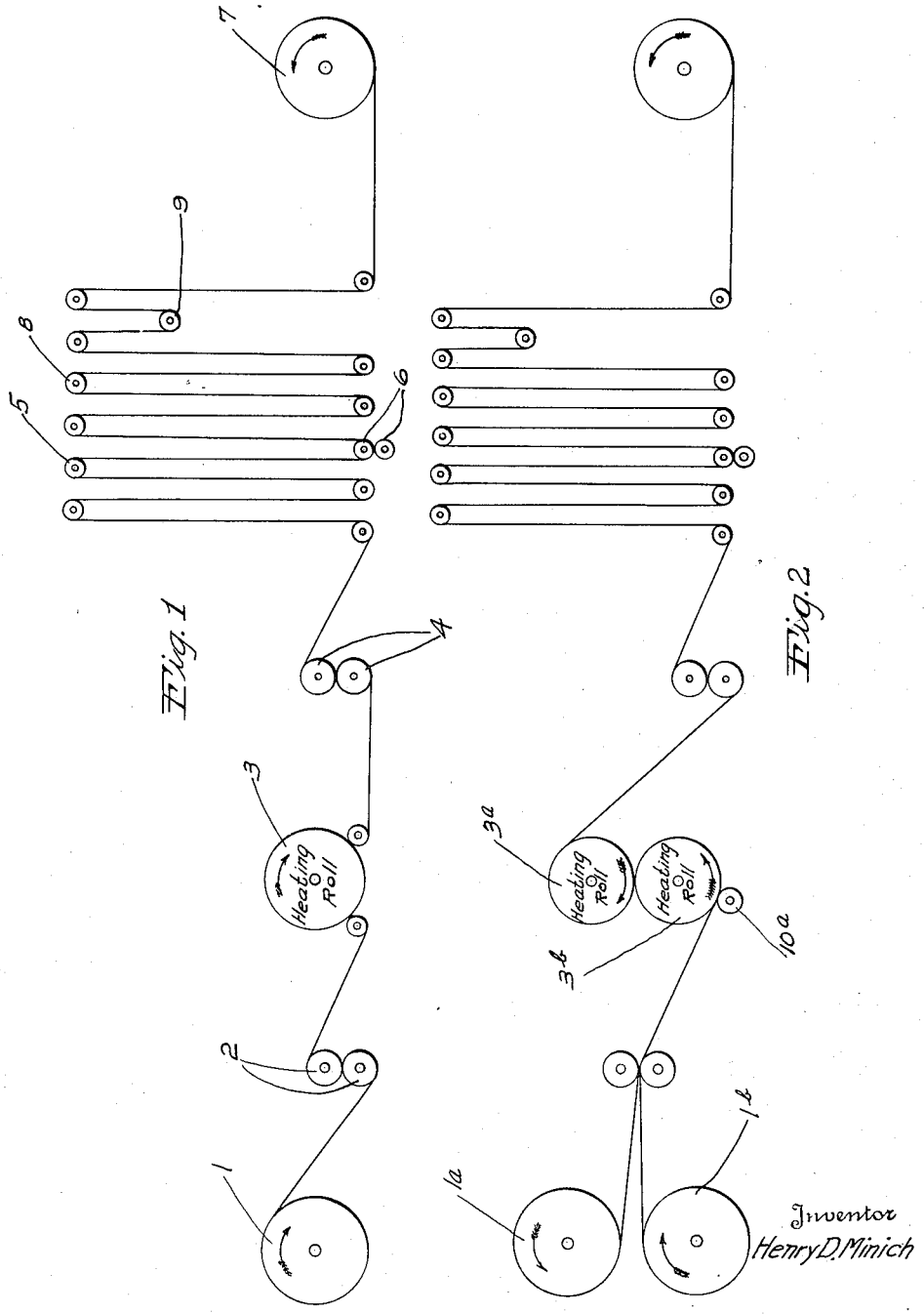
Inventor
Henry D. Minich
By
Attorney Patented Jan. 5, 1943

2,307,056

UNITED STATES PATENT OFFICE 2,307,056

FILM

Henry D. Minich, Tarrytown, N. Y.

Application August 3, 1940, Serial No. 350,625

3 Claims. (Cl. 18—57)

This invention relates to the stretching of thermo-stretchable, thermo-elastic films. By "thermo-stretchable" is meant the property of being stretchable when heated. By "thermo-elastic" is meant the property of tending to return partially or completely to the original unstretched condition when the stretching tension is released at or below the stretching temperature. This differentiates it from "thermo-plastic" where there is little or no tendency to contract upon release of the stretching tension.

It has been found that if the film of this invention, after heating and stretching, followed by cooling, is wound too soon it will shrink after winding and the tremendous pressure exerted by shrinking will cause the various plies to stick together or coalesce to the point where they cannot be separated. If the film is wound on the ordinary pulp board core, the shrinking will cause the core to collapse. According to this invention, after heating and stretching, followed by cooling, the film is allowed to shrink before it is wound. The amount which the film will shrink or retract is dependent upon the composition of the film, the temperature to which it is cooled under tension, etc.

The invention relates to all thermo-stretchable, thermo-elastic films, the internal viscosity, resulting from internal friction, of which at room temperature is such as to allow them to retract to some extent after heating and stretching. By heating, the internal viscosity of all thermoplastic films is reduced. The internal viscosity of the thermo-stretchable films of this invention is reduced on heating so that the films can readily be stretched. The stretch becomes permanent at the temperature at which the stretching tension is released, except for a certain contraction or retraction which does not occur immediately, and whose extent depends upon the degree of stretching, the temperature of stretching, and the temperature at which the tension on the film is released. According to this invention the winding of the stretched films is delayed until such retraction has taken place.

The following table shows the approximate amount which a plasticized film of rubber hydrochloride shrank after heating and stretching at the temperatures indicated, and after then cooling to room temperature without release of tension. The film in each instance was initially stretched to an amount such that after retracting when the tension was released, after cooling to room temperature, it would have a residual elongation of 300%, i. e., it would be four times its original length.

| Temperature of stretching | Initial elongation | Final elongation |
|---|---|---|
| 60° C | 450 | 300% |
| 90° C | 400 | 300% |
| 110° C | 350 | 300% |

Although the invention is described herein more particularly as applied to the stretching of rubber hydrochloride film, the invention is not limited thereto, but includes the stretching of other thermo-elastic, thermo-stretchable films which at ordinary temperatures have sufficient internal viscosity to prevent the stretched films from returning completely to their unstretched condition, but not sufficient internal viscosity to prevent any, or partial retraction of the stretched film.

The invention will be described in connection with the accompanying drawing. Fig. 1 shows schematically apparatus for stretching a single ply of film. Fig. 2 shows apparatus for stretching a multi-ply film.

In Fig. 1, the rubber hydrochloride film from the roll 1 is passed through the pinch rolls 2 and then around the heated roll 3. The temperature of the heated roll may vary but will ordinarily be around 90 to 110° C. The film then passes through the pull rolls 4. These are driven at a speed at least twice that of the pinch rolls 2 and the speed may be three or four or six or more times the speed of the rolls 2. The difference in the surface speed of the rolls 2 and 4 determines the extent to which the heated film is stretched. To be specific, if the surface speed of the rolls 4 is five times the surface speed of the rolls 2, then the film will be stretched to five hundred per cent of its original length in passing from the rolls 2 to the rolls 4. For the purpose of illustration the drawing is here discussed in connection with a film which is cooled to room temperature while under tension. The film may be cooled before it reaches the rolls 4. This may be done by washing the film with cold water or rapidly circulating cold air around the film. A cooling festoon may be used.

Regardless of the means employed for cooling the film, it is found that after the film is brought to room temperature and the stretching tension thereafter released, some retraction takes place. In Fig. 1 the film after passing through the rolls 4 is shown as being passed over the festoon 5.

It then goes through the rolls 6 and is eventually wound up on the roll 7. If the film is cooled to room temperature, by the time it passes between the rolls 4, it is not necessary to cool the film any further, and the festoon 5 may be omitted. If the film is at an elevated temperature as it passes through the rolls 4, it is brought to room temperature under tension by passing it over the festoon 5, or cooling it by other means. In this case the rolls 4 may be omitted. In this way it is brought to room temperature before it reaches the rolls 6. The rolls 6 are driven at the same surface speed as the rolls 4. The festoon 8 is provided to permit time for the film to retract before it is wound up on the roll 7. Depending upon the precise temperature in the range of 90°–110° C., when rolls 4 and 6 are driven at five times the surface speed of rolls 2, then roll 7 will be driven at between four and four and one-half times the surface speed of rolls 2, to allow for the retraction of the film. The speed at which this retraction takes place will depend upon the internal viscosity of the film. For example, rubber hydrochloride film which is plasticized with a material such as butyl stearate retracts much more rapidly than unplasticized film. Film which is plasticized in this manner, if rapidly cooled, so that it is brought to room temperature before it reaches the rolls 4, may be wound up almost directly after leaving these rolls. The festoons 5 and 8 are unnecessary for such film.

Regardless of the exact equipment employed, it is desirable to have a floating roll or some similar device to equalize variations in the degree to which the film contracts or in the surface speed at which the film is rolled up on roller 7, and to take up the slack produced by any such variation. Such a floating roll is indicated by the roll 9. This may be of any usual design. It is weighted and is so mounted that it can easily rise or fall depending upon whether the film is being rolled at a slightly greater or less speed than the speed at which the film is being supplied.

Fig. 2 shows somewhat similar equipment but with provision for the simultaneous stretching of a number of plies of film. These plies may be united before or after stretching. The plies of rubber hydrochloride film are wound on the rolls 1a and 1b. They are drawn off simultaneously and passed over the heated rolls 3a and 3b. A roll 10a is provided for insuring close contact between the plies as they pass over the heated rolls and to remove entrapped air from between the plies. The thicker the sheet, the greater the problem of cooling it to room temperature and the greater the amount of cooling space required. The equipment shown in Fig. 2 is similar to that shown in Fig. 1, and like parts perform like functions.

The novel features of the invention disclosed herein are equally applicable to the stretching and laminating processes and products disclosed in my copending applications as follows: Applications Ser. No. 77,123, filed April 30, 1936, and Ser. No. 251,465, filed January 18, 1939, and the specifications and drawings of my said prior applications are hereby included as a part of the present application.

Although the invention has been described more particularly as applied to the treatment of rubber hydrochloride film, it applies also to the treatment of other films such as films of plasticized polyvinyl derivatives, thermoplastic cellulosic derivatives, etc.

I claim:

1. In the method of stretching a film of thermo-stretchable, thermo-elastic material which after stretching at an elevated temperature has sufficient internal viscosity to prevent most but not all of the material's tendency to retract to its original, unstretched condition, the step which comprises releasing the stretching tension from the film and allowing the film to retract until substantially all retraction which is possible has taken place and then winding the film.

2. The process of claim 1 in which the film is cooled to room temperature and thereafter allowed to retract before winding.

3. The method of stretching rubber hydrochloride film which comprises heating the same and stretching it at an elevated temperature and then after removing the stretching tension from the film, allowing the film to retract until substantially no further retraction takes place and then winding the film.

HENRY D. MINICH.